United States Patent [19]

Yamato et al.

[11] Patent Number: 4,681,075
[45] Date of Patent: Jul. 21, 1987

[54] IDLING SPEED FEEDBACK CONTROL METHOD FOR INTERNAL COMBUSTION ENGINES

[75] Inventors: Akihiro Yamato, Shiki; Yuzuru Koike; Kyozo Futa, both of Utsunomiya, all of Japan

[73] Assignee: Honda Giken Kogyo Kabushiki Kaisha, Tokyo, Japan

[21] Appl. No.: 787,749

[22] Filed: Oct. 15, 1985

[30] Foreign Application Priority Data

Oct. 15, 1984 [JP] Japan .................................. 59-214216

[51] Int. Cl.⁴ .............................................. F02D 41/16
[52] U.S. Cl. ...................................... 123/339; 123/585
[58] Field of Search ................................. 123/339, 585

[56] References Cited

U.S. PATENT DOCUMENTS 4,402,289 9/1983 Ikeura ................................... 123/339

FOREIGN PATENT DOCUMENTS

22017   2/1979 Japan ................................... 123/339
53648   3/1983 Japan ................................... 123/339
124052  7/1983 Japan .

Primary Examiner—Tony M. Argenbright
Attorney, Agent, or Firm—Lyon & Lyon

[57] ABSTRACT

A method of controlling the operating amount of a control valve for regulating the quantity of supplementary air being supplied to an internal combustion engine, in a feedback manner responsive to the difference between a desired idling speed and an actual engine speed, while the engine is in a predetermined idling region. When the engine is in a predetermined decelerating region immediately preceding the predetermined idling region, a basic value of the operating amount of the control valve is corrected in dependence upon a detected value of the engine temperature and a detected value of the decreasing rate of the engine speed. When the engine is further decelerated into the predetermined idling region, the feedback control is started by applying the corrected basic value of the operating amount of the control valve as an initial value thereof. Preferably, when the engine is in the predetermined decelerating region, the operating amount of the control valve is set to a value equal to the initial value applicable at the start of the feedback control, and supplementary air is supplied to the engine in a quantity corresponding to the set operating amount of the control valve.

12 Claims, 11 Drawing Figures

IDLING SPEED FEEDBACK CONTROL METHOD FOR INTERNAL COMBUSTION ENGINES

BACKGROUND OF THE INVENTION

This invention relates to an idling speed feedback control method for internal combustion engines, and more particularly to a method of this kind which is intended to prevent a lag in the feedback control of the idling speed, at the start of the same control immediately following rapid deceleration of the engine, to thereby prevent engine stall.

In an internal combustion engine, the engine can easily stall due to a drop in the engine speed when the engine is operated in an idling condition at a low temperature of the engine cooling water. To eliminate such disadvantage, an engine speed feedback control method has been proposed, which comprises setting a desired idling speed in dependence upon the engine cooling water temperature, detecting the difference between the actual engine speed and the desired idling speed, and supplying supplementary air to the engine in a quantity corresponding to the detected difference so as to minimize the same difference, to thereby control the engine speed to the desired idling speed.

Further, to eliminate a lag in the idling speed feedback control at the start of the same control, a method has been proposed, e.g. by Japanese Provisional Patent Publication (Kokai) No. 58-124052, which is adapted to supply the engine with supplementary air in a quantity required for maintaining the engine speed at or in the vicinity of the desired idling speed before the feedback control of the idling speed is started, when the engine speed decreases below a predetermined value higher than an upper limit value of the engine speed at which the feedback control of the idling speed should be started, while the engine is decelerating.

However, if the engine is rapidly decelerated with the throttle valve fully closed, i.e. if the engine speed decreases at a large rate, particularly when the engine temperature is low and at the same time the clutch is disengaged, the charging efficiency of intake air supplied to the engine drops, such that the engine is not supplied with a mixture in a quantity sufficient for producing required output torque, which can cause a sudden drop in the engine speed, often resulting in engine stall depending upon the magnitude of load applied on the engine. However, if a supplementary air quantity is previously increased by a predetermined increment and the increased supplementary air is supplied to the engine before the start of the feedback control, in an attempt to avoid the above disadvantage, a further disadvantage can occur when the engine is slowly decelerated, i.e. if the engine speed decreases at a small rate, such that the engine speed cannot be promptly controlled to the desired idling speed, resulting in a lag in the feedback control of the idling speed.

SUMMARY OF THE INVENTION

It is an object of the present invention to provide an idling speed control method for an internal combustion engine, which is adapted to supply supplementary air to the engine in a required quantity depending upon the engine temperature and the decreasing rate of the engine speed, when the engine is decelerating immediately before entering the idling speed feedback control region, so as to prevent engine stall even if the engine is rapidly decelerated while the engine temperature is low, as well as to eliminate a lag in feedback control of the idling speed at the start of the same control, to thereby obtain stable rotation of the engine.

In order to attain the above object, the present invention provides a method of controlling the operating amount of a control valve for regulating the quantity of supplementary air being supplied to an internal combustion engine, in a feedback manner responsive to the difference between a desired idling speed and an actual engine speed, while the engine is in a predetermined idling region, the engine having an intake passage, a throttle valve arranged in the intake passage, and an air passage having one end communicating with the intake passage at a location downstream of the throttle valve and another end with the atmosphere, respectively, the control valve being arranged in the air passage, the supplementary air being supplied to the engine through the air passage and the intake passage.

The method according to the invention is characterized by comprising the following steps: (a) detecting a temperature of the engine; (b) detecting the decreasing rate of the engine speed when the engine is decelerating with the throttle valve fully closed in a predetermined decelerating region immediately preceding the predetermined idling region; (c) correcting a basic value of the operating amount of the control valve based upon the detected temperature of the engine and the detected decreasing rate of the engine speed; and (d) starting the feedback control by applying the basic value of the operating amount of the control valve thus corrected as an initial value thereof, when the engine is further decelerated into the predetermined idling region.

Preferably, when the engine is in the predetermined decelerating region, the operating amount of the control valve is set to a value equal to the aforementioned initial value thereof applicable at the start of the feedback control, and the engine is supplied with supplementary air through the control valve in a quantity corresponding to the operating amount of the control valve thus set while the engine is decelerating in the predetermined decelerating region.

The predetermined decelerating region is a region wherein the engine speed is higher than the desired idling speed and at the same time lower than a predetermined value thereof set in dependence upon the detected engine temperature.

The predetermined value of the engine speed may preferably be set to higher values as the detected engine temperature increases.

The basic value of the operating amount of said control valve may preferably be set to smaller values as the detected engine temperature increases.

Preferably, a predetermined value of the decreasing rate of the engine speed is set based upon the detected engine temperature. When the detected decreasing rate of the engine speed is smaller than the set predetermined value, the basic value of the operating amount of the control value is corrected so as to increase at a first rate which corresponds to the detected engine temperature, while when the detected decreasing rate of the engine speed is larger than the predetermined value, the basic value of the operating amount of the control valve is corrected so as to increase at a second rate larger than the first rate, which corresponds to the detected engine temperature.

The predetermined value of the decreasing rate of the engine speed may preferably be set to smaller values as the detected engine temperature increases.

The above and other objects, features and advantages of the invention will be more apparent from the ensuing detailed description taken in conjunction with the accompanying drawings.

DETAILED DESCRIPTION

The method of the invention will now be described in detail with reference to the accompanying drawings.

Figure 1:
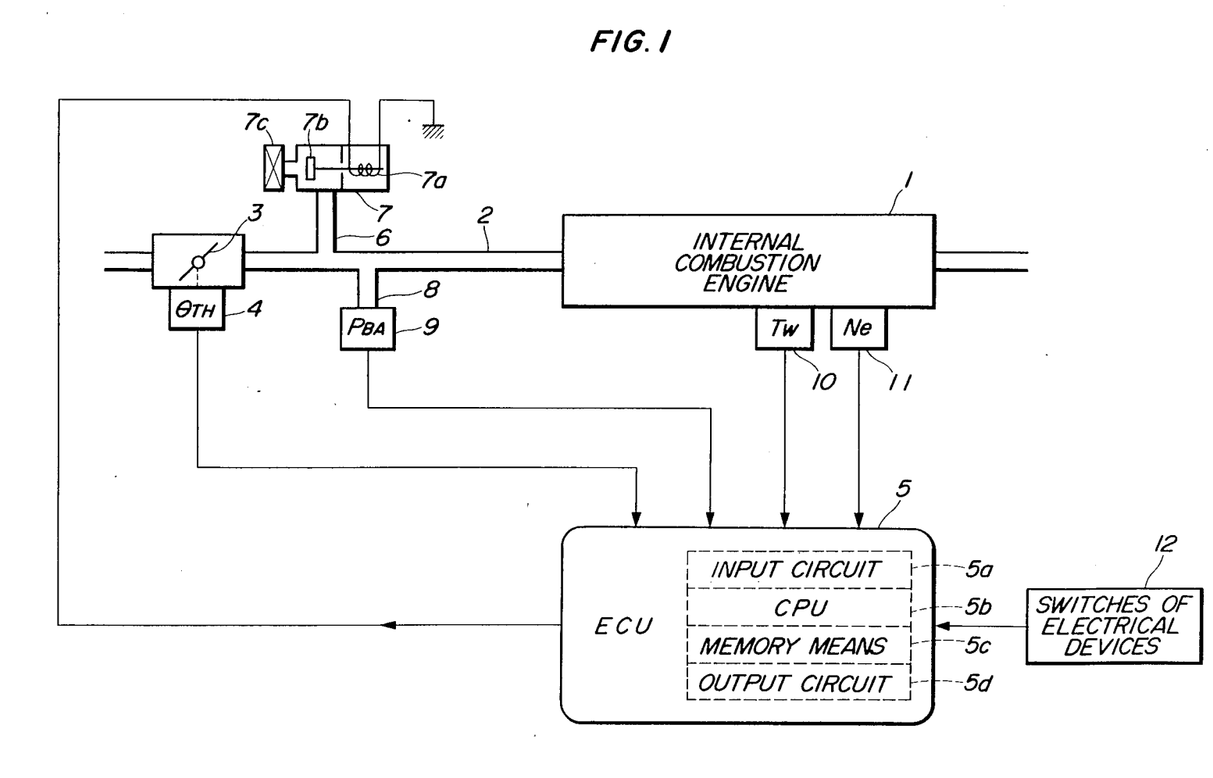
FIG. 1 is a block diagram illustrating the whole arrangement of an idling speed feedback control system of an internal combustion engine, to which the method of the invention is applied.

Referring first to FIG. 1, an idling speed control system of an internal combustion engine is schematically illustrated, to which is applied the method of the invention. Reference numeral 1 designates an internal combustion engine which may be a four-cylinder type, and to which is connected an intake pipe 2 at an intake side of the engine 1. A throttle valve 3 is arranged within the intake pipe 2, on which is mounted a throttle valve opening (θth) sensor 4 which is electrically connected to an electronic control unit (hereinafter called "the ECU") 5 and adapted to convert throttle valve opening into an electrical signal and supply the electrical signal indicative of the throttle valve opening (θth) to the ECU 5. An air passage 6 opens at its one end into the intake pipe 2 at a location downstream of the throttle valve 3. The air passage 6 has its other end communicating with the atmosphere and provided with an air cleaner 7c. A supplementary air quantity control valve (hereinafter merely called "the control valve") 7 is arranged across the air passage 6 to control the quantity of supplementary air being supplied to the engine 1 through the air passage 6 and the intake pipe 2. This control valve 7 is a normally closed type solenoid-controlled valve, and comprises a solenoid 7a and a valve 7b disposed to open the air passage 6 when the solenoid 7a is energized. The solenoid 7a is electrically connected to the ECU 5.

An intake pipe absolute pressure (PBA) sensor 9 is provided in communication with the intake pipe 2 through a conduit 8 at a location downstream of the one end of the air passage 6, which is electrically connected to the ECU 5 and adapted to convert intake pipe absolute pressure PBA into an electrical signal indicative of the intake pipe absolute pressure PBA for supplying the same signal to the ECU 5. An engine cooling water temperature (TW) sensor 10 is mounted on the cylinder block of the engine 1, which is electrically connected to the ECU 9 for supplying same with an electric signal indicative of engine cooling water temperature TW.

An engine rpm (Ne) sensor 11 is arranged on a camshaft, not shown of the engine 1 or a crankshaft of same, not shown, and adapted to generate one pulse at a particular crank angle each time the engine crankshaft rotates through 180 degrees, i.e., each pulse of the top-dead-center position (TDC) signal. Pulses of the TDC signal generated by the Ne sensor 11 are supplied to the ECU 5. Further connected to the ECU 5 are switches 12 of electrical devices, such as head lamps. Signals indicative of the on-off conditions of the switches 12 are supplied to the ECU 5.

The ECU 5 comprises an input circuit 5a having functions of shaping waveforms of pulses of input signals from the aforementioned various sensors, shifting voltage levels of the input signals, and converting analog values of the input signals into digital signals, etc., a central processing unit (hereinafter called "the CPU) 5b, memory means 5c storing storing various calculation programs executed within the CPU 5b and for storing various calculated data from the CPU 5b, and an output circuit 5d for supplying driving signals to the control valve 7.

The ECU 5 is supplied with input signals from the throttle valve opening sensor 4, the absolute pressure sensor 9, the engine cooling water temperature sensor 10, and the engine rpm sensor 11 as well as the signals indicative of the on-off conditions of the switches 12. Then, the ECU 5 determines operating conditions of the engine 1 and engine load conditions such as electrical loads on same on the basis of the input signals from these engine operation parameter signals as well as the signals indicative of the on-off conditions of the switches 12, and then calculates, by the use of a predetermined equation, a desired idling speed at idling of the engine 1, that is, a desired valve opening duty ratio DOUT of the control valve 7, on the basis of the determined engine operating conditions, etc. Then the ECU 5 supplies driving signal pulses corresponding to the calculated value DOUT to the control valve 7.

The control valve 7 has its solenoid 7a energized by each of its driving pulses to open the air passage 6 for a period of time corresponding to its calculated valve opening duty ratio DOUT so that a required quantity of supplementary air corresponding to the calculated valve opening duty ratio DOUT is supplied to the engine 1 through the air intake passage 6 and the intake pipe 2.

When the valve opening period of the control valve 7 is increased to increase the quantity of supplementary air, the engine output is increased, resulting in an increase in the engine speed, whereas a decrease in the valve opening period causes a corresponding decrease in the engine speed. In this manner, the engine speed during idling of the engine is controlled by controlling the supply quantity of supplementary air or the valve opening period of the control valve 7. By supplying a suitable quantity of supplementary air, it can be avoided that a drop in the engine speed during idling of the engine is caused, for instance, by an increase in the load on the engine while the engine temperature is low.

Figure 2:
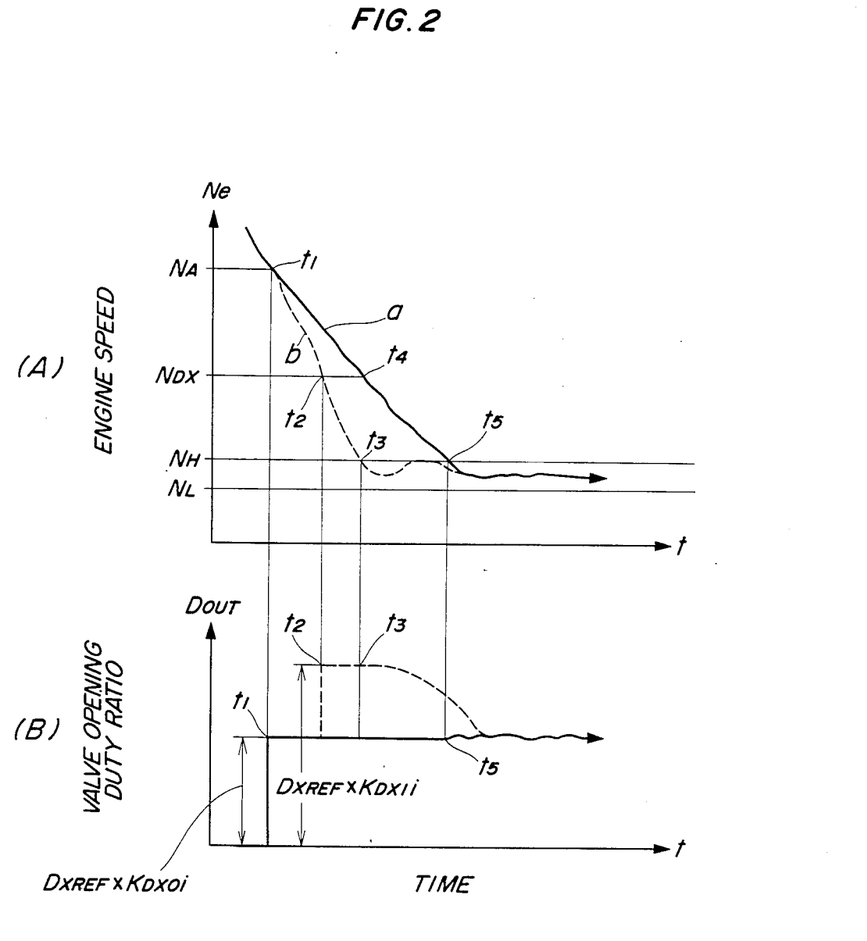
FIGS. 2(A) and 2(B) are a timing chart showing the method of the invention.

The idling speed feedback control method according to the invention will now be explained with reference to FIG. 2 illustrating the relationship between the engine speed Ne and the valve opening duty ratio DOUT of the control valve 7.

Figure 8:
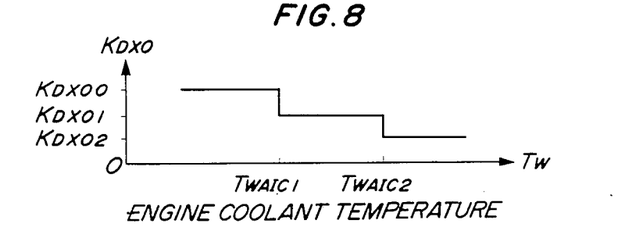
FIG. 8 is a view showing a KDX0i - TW table for determining a correction coefficient value KDX0i which is applied in decelerating mode control of the supplementary air quantity when the engine is slowly decelerated as indicated by the solid line a in FIG. 2, based upon the engine coolant temperature TW.

When the engine speed Ne decreases below a predetermined value NA (e.g. 1300 rpm) while the engine 1 is decelerating with the throttle valve 3 fully closed [at t1 in (A) of FIG. 2], the valve opening duty ratio DOUT of the control valve 7 is set to an initial value (=DXREF×KDX0i) applicable at the start of the feedback control which is effected after t5 if the engine is slowly decelerating as indicated by the solid line a in FIG. 2, or after t3 if the engine is rapidly decelerating as indicated by the broken line b in FIG. 2, as shown in (B) of FIG. 2. DXREF is a mean value of values of the valve opening duty ratio DOUT which have been applied during past feedback control, and is calculated in a manner hereinafter explained with reference to FIG. 10, while KDX0i, hereinafter explained in detail, is a value of a correction coefficient KDX0 which is selected in dependence on the engine coolant temperature TW from a table as shown in FIG. 8. If the engine is slowly decelerating along the solid line a in FIG. 2, supplementary air is continuously supplied to the engine in a quantity corresponding to the valve opening duty ratio DOUT thus set to the above initial value (=DXREF×KDX0i), from the time the engine speed Ne decreases below the predetermined value NA (t1 in FIG. 2) to the time it further decreases to an upper limit value NH of a desired idling speed range which is set in dependence upon the engine coolant temperature TW, whereupon the feedback control of the supplementary air quantity is started at t5 in FIG. 2. This manner of controlling the quantity of supplementary air being supplied to the engine is hereinafter called "the decelerating mode control". In this way, the engine is beforehand supplied with supplementary air in a quantity controlled in decelerating mode from the time the engine speed Ne decreases below the predetermined value NA to the time it further decreases to the upper limit value NH of the desired idling speed range whereupon the feedback control should be started. By virtue of this control manner, the operation of the engine can be smoothly shifted from the decelerating region into the idling speed feedback control region, without causing a large drop in the engine speed below the desired idling speed.

When the engine speed Ne decreases below the upper limit value NH of the desired idling speed range (at t5 in FIG. 2), the feedback control is started to control the valve opening duty ratio DOUT of the control valve 7 in response to the difference between the actual engine speed Ne and the desired idling speed, so as to maintain the engine speed Ne within the desired idling speed range defined by the upper limit value NH and a lower limit value NL smaller than the upper limit value NH by a predetermined value.

Figure 6:
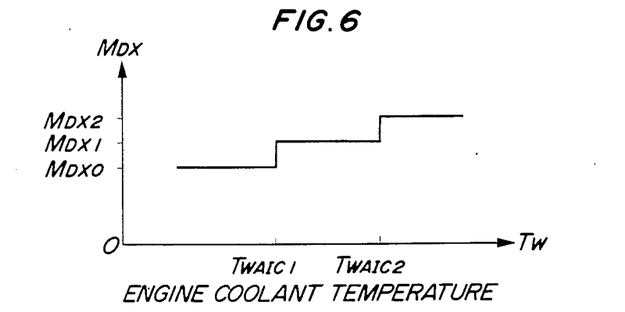
FIG. 6 is a view showing an MDX - TW table for determining a value MDX corresponding to the reciprocal of a reference engine speed value NDX, based upon the engine coolant temperature TW.
Figure 9:
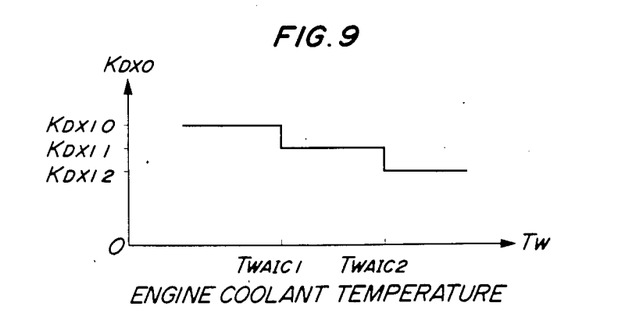
FIG. 9 is a view showing a KDX1i - TW table for determining a correction coefficient value KDX1i which is applied in decelerating mode control of the supplementary air quantity when the engine is rapidly decelerated as indicated by the broken line b in FIG. 2, based upon the engine coolant temperature TW.

On the other hand, if the engine is rapidly decelerating along the broken line b in (A) of FIG. 2, when the engine speed Ne decreases below a reference value NDX which is larger than the upper limit value NH of the desired idling speed range by a predetermined value, and set in dependence upon the engine coolant temperature from a table as shown in FIG. 6, hereinafter referred to, (i.e. t2 in FIG. 2), the valve opening duty ratio DOUT of the control valve 7 is set to a value (=DXREF×KDX1i) larger than the aforementioned value (=DXREF×KDX0i) thereof, so as to supply the engine with supplementary air in a quantity corresponding to the newly set value of the valve opening duty ratio DOUT through the control valve 7. KDX1i is a value of a correction coefficient KDX1 which is selected in dependence upon the engine coolant temperature TW from a table as shown in FIG. 9, hereinafter referred to. Thereafter, when the engine speed further decreases to the upper limit NH of the desired idling speed (at t3 in FIG. 2), at which speed feedback control should be started, the feedback control is started to control the valve opening duty ratio DOUT of the control valve 7 in a feedback manner by applying the above value (=DXREF×KDX1i) of the valve opening duty ratio DOUT as an initial value. By virtue of this control manner, even if the engine is rapidly decelerated, i.e. even if the engine speed Ne decreases at a large rate, the engine operation can be smoothly shifted into the idling speed feedback control region, without a control lag.

Figure 3:
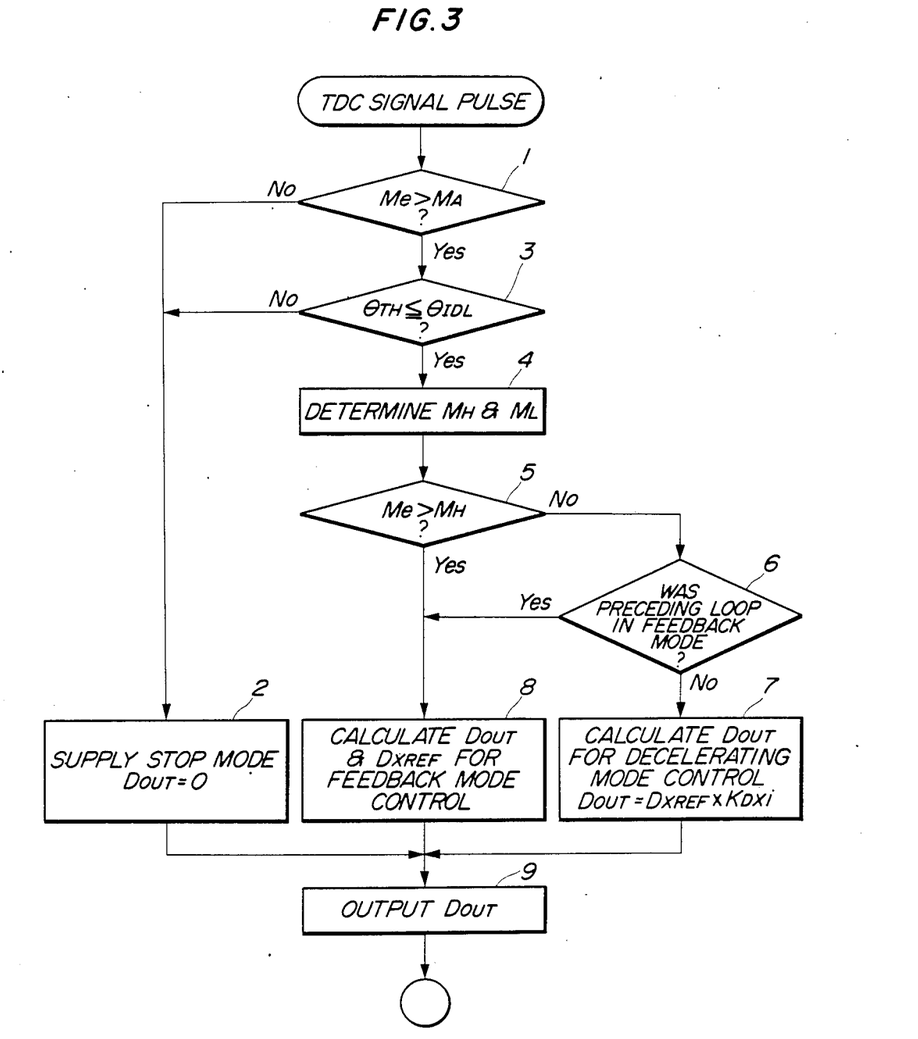
FIG. 3 is a flow chart showing a manner of calculating the valve opening duty ratio DOUT of a control valve for regulating the quantity of supplementary air, which is executed within an electronic control unit (ECU) in FIG. 1.

FIG. 3 shows a manner of controlling the valve opening duty ratio DOUT of the control valve 7, which is executed within the ECU 5 in FIG. 1 in synchronism with generation of pulses of the TDC signal.

Upon input of a TDC signal pulse from the Ne sensor 11 in FIG. 1, it is determined at the step 1 whether or not an input value Me corresponding to the reciprocal of the engine speed Ne is larger than a value MA corresponding to the reciprocal of the predetermined value NA (e.g. 1300 rpm). The values Me and MA are employed in the determination of step 1 executed within the ECU 5 instead of the engine speed values Ne and NA, respectively, for facilitating the calculation, and are each indicative of a time interval between two adjacent pulses of the TDC signal. If the answer is no, that is, if the engine speed Ne is higher than the predetermined value NA (before t1 in FIG. 2), the valve opening duty ratio DOUT of the control valve 7 is set to zero, at the step 2, since the supply of supplementary air to the engine is then unnecessary. This control mode in which the valve opening duty ratio DOUT is set to zero so as to fully close the control valve is hereinafter referred to as "the supply stop mode". In this manner, when the supply of supplementary air is not required, no energization of the solenoid 7a of the control valve 7 is effected so as to prohibit repeated opening and closing actions of the valve 7b and minimize the adverse influence of heat from the energized solenoid 7a upon the valve 7b, thereby prolonging the life of the control valve 7.

On the other hand, if the answer at the step 1 is yes (i.e. if the relationship of Me>MA is satisfied), that is, if the engine speed Ne is lower than the predetermined value NA, it is determined whether or not the throttle valve opening θth is smaller than a predetermined value θIDL corresponding to a substantially closed position of the throttle valve 3, at the step 3. If the answer at the step 3 is no, the program proceeds to the step 2 to set the valve opening duty ratio DOUT to zero, to fully close the control valve 7. If the answer is yes, i.e. if the throttle valve 3 is substantially fully closed, the program proceeds to the step 4 to set a value MH corresponding to the reciprocal of the upper limit value NH of the desired idling speed range as well as a value ML corresponding to the reciprocal of the lower limit value NL of the same range.

Figure 4:
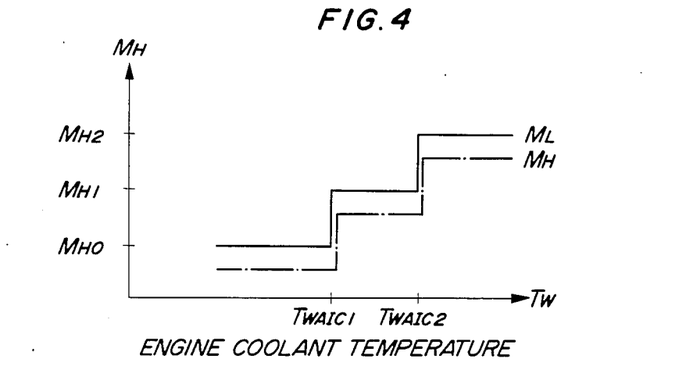
FIG. 4 is a view showing an MH, ML - TW table for determining a value MH corresponding to the reciprocal of an upper limit value NH of a desired idling speed range and also a value ML corresponding to the reciprocal of a lower limit value NL of the same range, based upon the engine coolant temperature TW.

FIG. 4 shows an MH, ML - TW table from which the above values MH and ML are selected. As shown in FIG. 4, the value MH corresponding to the reciprocal of the upper limit value NH is set to smaller values as the engine coolant temperature TW increases. To be specific, the value MH is set to a value MH0 corresponding to the reciprocal of an engine speed value, e.g. 900 rpm when the engine coolant temperature TW is below a predetermined value TWAIC1 (e.g. 65° C.), the value MH is set to a value MH1 corresponding to the reciprocal of an engine speed value, e.g. 800 rpm when the engine coolant temperature TW is between the predetermined value TWAIC1 and a predetermined value TWAIC2 (e.g. 75° C.), and the value MH is set to a value MH2 corresponding to the reciprocal of an engine speed value, e.g. 700 rpm when the engine coolant temperature TW is above the second predetermined value TWAIC2. On the other hand, the value ML corresponding to the reciprocal of the lower limit value NL is set in a manner similar to the above, but it is set to values each of which makes its resulting lower limit value NL always smaller than corresponding one of the upper limit value NH by a constant value, e.g. 50 rpm.

Then, at the step 5, it is determined whether or not the value Me corresponding to the actual engine speed Ne is larger than the above set value MH corresponding to the reciprocal of the predetermined upper limit value NH of the desired idling speed range determined at the step 4. If the answer at the step 5 is no, that is, if the engine speed Ne is higher than the predetermined upper limit value NH of the desired idling speed range (i.e. from t1 to t5 if the engine is slowly decelerating along the solid line a in FIG. 2, or from t1 to t3 if the engine is rapidly decelerating along the broken line b in FIG. 2), it is judged that the engine is in a decelerating mode control region, and the program proceeds to the step 6 to determine whether or not the preceding loop was in feedback mode. If the answer at the step 6 is no, then the program proceeds to the step 7 wherein the valve opening duty ratio DOUT of the control valve 7 is calculated for decelerating mode control. That is, at the step 7, the valve opening duty ratio DOUT applied during decelerating mode control is set to a product of the aforementioned mean value DXREF of the valve opening duty ratio DOUT values which have been applied during past feedback control, which mean value DXREF is employed as a basic value, and a correction coefficient KDXi according to the invention.

Figure 5:
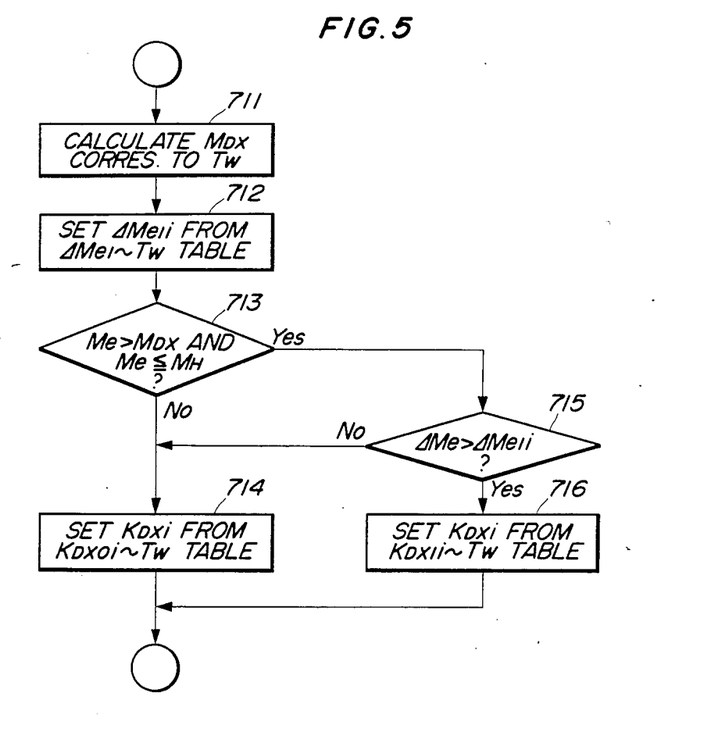
FIG. 5 is a flow chart showing a manner of calculating the value of a correction coefficient KDXi according to the invention.

FIG. 5 is a flow chart showing a manner of calculating the value of the correction coefficient KDXi. First, at the step 711, a value MDX corresponding to the reciprocal of the aforementioned reference engine speed value NDX is set in dependence on the engine coolant temperature TW detected by the engine cooling water temperature sensor 10 in FIG. 1, from an MDX - TW table as shown in FIG. 6. As shown in FIG. 6, the value MDX is set to larger values as the detected engine coolant temperature TW increases. Also, the value MDX is set to a value which is larger than the value MA corresponding to the reciprocal of the predetermined engine speed value NA and at the same time corresponds to the reciprocal of the reference value NDX always larger than the upper limit value NH of the desired idling speed range set at the aforementioned step 4 in FIG. 3 in dependence upon the detected engine coolant temperature TW, by a constant value, e.g. 300 rpm. To be specific, the value MDX is set to a value MDX0 corresponding to the reciprocal of an engine speed value, e.g. 1200 rpm when the detected engine coolant temperature TW is below the predetermined value TWAIC1 (e.g. 65° C.), the value MDX is set to a value MDX1 corresponding to the reciprocal of an engine speed value, e.g. 1100 rpm when the detected engine coolant temperature TW is between the predetermined values TWAIC1 and TWAIC2 (e.g. 75° C.), and the value MDX is set to a value MDX2 corresponding to the reciprocal of an engine speed value, e.g. 1000 rpm when the engine coolant temperature TW is above the predetermined value TWAIC2. Thus, the value MDX is set to larger values as the detected engine coolant temperature TW increases, that is, the reference value NDX is set to lower values as the same temperature TW increases, because the higher the engine coolant temperature, the lesser the fear of engine stall.

Figure 7:
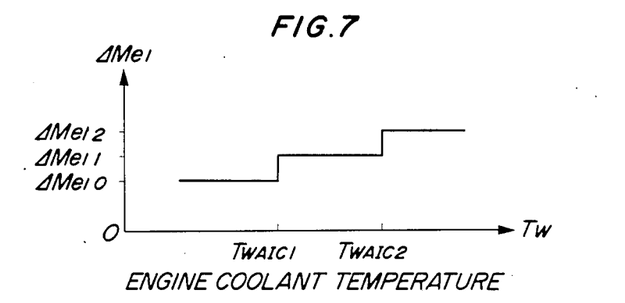
FIG. 7 is a view showing a ΔMe1 - TW table for determining a reference value ΔMe1 for determining the magnitude of the decreasing rate of the engine speed Ne, based upon the engine coolant temperature TW.

Reverting to FIG. 5, next, the step 712 is executed to set a reference value ΔMe1 for determining the decreasing rate of the engine speed Ne, in dependence on the detected engine coolant temperature TW, from a ΔMe1-TW table as shown in FIG. 7. As shown in FIG. 7, the reference value ΔMe1 is set to larger values as the engine coolant temperature TW increases. To be specific, the value ΔMe1 is set to a value ΔMe10 when the engine coolant temperature TW is below the predetermined value TWAIC1 (e.g. 65° C.), the value ΔMe1 is set to a value ΔMe11 when the engine coolant temperature TW is between the predetermined values TWAIC1 and TWAIC2 (e.g. 75° C.), and the value ΔMe1 is set to a value ΔMe12 when the engine coolant temperature is above the predetermined value TWAIC2. Thus, the reference value ΔMe1 is set to larger values as the detected engine coolant temperature TW increases, because the higher the engine coolant temperature, the lesser the fear of engine stall, even if the engine speed decreases at a large rate.

Then, at the step 713 in FIG. 3, it is determined whether or not a present value of the value Me corresponding to the reciprocal of the engine speed Ne is larger than the value MDX corresponding to the reference engine speed NDX which has been set at the step 711, and at the same time, it is smaller than the value MH corresponding to the reciprocal of the upper limit value NH of the desired idling speed range which has been set at the step 4 in FIG. 3 (i.e. whether or not the relationship of Me>MDX and the relationship of Me<MH stand at the same time). If the answer to the question of the step 713 is no (i.e. from t1 to t4 if the engine is decelerating along the solid line a, or from t1 to t2 if the engine is decelerating along the broken line b), the program proceeds to the step 714 to calculate the value KDX0i of a first correction coefficient KDX0 of the correction coefficient KDXi in dependence upon the detected engine coolant temperature TW, from a KDX0i - TW table as shown in FIG. 8.

As shown in FIG. 8, the value KDX0i of the first correction coefficient KDX0 is set to smaller values as the detected engine coolant temperature TW increases. To be specific, the value KDX0i is set to a value KDX00, e.g. 2.0 when the engine coolant temperature TW is below the predetermined value TWAIC1, the value KDX0i is set to a value KDX01, e.g. 1.5 when the engine coolant temperature TW is between the predetermined values TWAIC1 and TWAIC2, and the value KDX0i is set to a value KDX02, e.g. 1.0 when the engine coolant temperature TW is above the predetermined value TWAIC2.

On the other hand, if the answer to the question of the step 713 is yes (i.e. from t4 to t5 if the engine is decelerating along the solid line a in FIG. 2, or from t2 to t3 if the engine is decelerating along the broken line b in FIG. 2), the program proceeds to the step 715 to determine whether or not a value $\Delta$Me indicative of the actual decreasing rate of the engine speed Ne is larger than the reference value $\Delta$Meli which has been set at the step 712. The value $\Delta$Me is calculated as the difference $\Delta$Me ($=$Men$-$Men-4) between a present value Men of the value Me corresponding to the reciprocal of the actual engine speed Ne obtained in the present loop and a value Men-4 of same which was obtained in a preceding loop executed in synchronism with generation of a TDC signal pulse corresponding to the same cylinder that a present TDC signal pulse corresponds to. Since the engine 1 to which the method of the invention is applied has four cylinders, the value Men-4 was obtained at the time of generation of a fourth TDC signal pulse before the present one, and has been stored in the memory means 5c of the ECU 5. Thus, the present value Men is compared with the value Men4 obtained in the preceding loop executed in synchronism with the fourth pulse before the present one, so as to eliminate adverse influence of variations in the operating characteristics of the Ne sensor 11 between different production lots and/or mounting tolerances of the same sensor upon the calculation of the reference value $\Delta$Me, to thereby obtain an acurate value of the reference value $\Delta$Me. If the adverse influence of the variations and/or the mounting tolerances is within a negligible range, the present value Men of the value Me may be compared with an immediately preceding value Men-1 thereof obtained at the time of generation of an immediately preceding TDC signal pulse.

If the answer at the step 715 is no, that is, if the relationship of $\Delta$Me$\leq$$\Delta$Meli stands, it is judged that the engine is slowly decelerating along the solid line a in FIG. 2 [from t4 to t5 in in (A) of FIG. 2 (A)]. Then, the program proceeds to the aforementioned step 714 to set the value KDX0i of the first correction coefficient KDX0 based upon the detected engine coolant temperature TW, from the KDX0i - TW table shown in FIG. 8. On the other hand, if the answer at the step 715 is no, that is, if the relationship of $\Delta$Me$>$$\Delta$Mel i stands, it is judged that the engine is rapidly decelerating along the broken line b in FIG. 2 [from t2 to t3 in (A) of FIG. 2 (A)]. Then, the program proceeds to the step 716 to set the value KDX1i of a second correction coefficient KDX1 of the correc-tion coefficient KDXi based upon the detected engine coolant temperature TW, from a KDX1i - TW table as shown in FIG. 9.

As shown in FIG. 9, the value KDX1i of the second correction coefficient KDX1 is set to values each larger than a corresponding one of the first correction coefficient values KDX0i in FIG. 8, which corresponds to the same engine coolant temperature as the each second correction coefficient value KDX1i corresponds to. To be specific, the value KDX1i is set to a value KDX10, e.g. 4.0 when the detected engine coolant temperature TW is below the predetermined value TWAIC1, to a value KDX11, e.g. 3.0 when the detected engine coolant temperature TW is between the predetermined values TWAIC1 and TWAIC2, and to a value KDX12, e.g. 2.0 when the detected engine coolant temperature TW is above the predetermined value TWAIC2, respectively.

In the manner described as above, the value of the correction coefficient KDXi is set in dependence upon the detected engine coolant temperature TW and the decreasing rate of the engine speed Ne, and the mean value DXREF as the basic value of the valve opening duty ratio DOUT of the control valve 7 is corrected by means of the set value of the correction coefficient KDXi, to supply the engine with supplementary air in a quantity corresponding to the valve opening duty ratio DOUT ($=$DXREF$\times$KDXi) thus set (step 7 in FIG. 3) during decelerating mode control.

By employing the mean value DXREF of valve opening duty ratio DOUT values applied during past feedback mode control as the basic value for setting the initial value of the valve opening duty ratio DOUT applicable at the start of the present feedback mode control, it can be prevented that the actual supplementary air quantity deviates from a required value corresponding to the set DOUT value, due to variations in the operating characteristics of the control valve 7 between different production lots, aging degradation in the performance of the same valve 7 per se, and/or aging change in the degree of clogging of the air filter 7c.

When the engine speed Ne further decreases so that the answer to the question of the step 5 in FIG. 3 becomes yes (i.e. if the relationship of Me$\geq$MH is satisfied), that is, if the engine speed Ne becomes lower than the predetermined upper limit value NH of the desired idling speed range [i.e. at t5 in (A) of FIG. 2 if the engine is decelerating along the solid line a, or at t3 in (A) of FIG. 2 if the engine is decelerating along the broken line b], the program proceeds to the step 8 to calculate the valve opening duty ratio DOUT as well as the mean value DXREF as the basic value thereof for feedback mode control.

Figure 10:
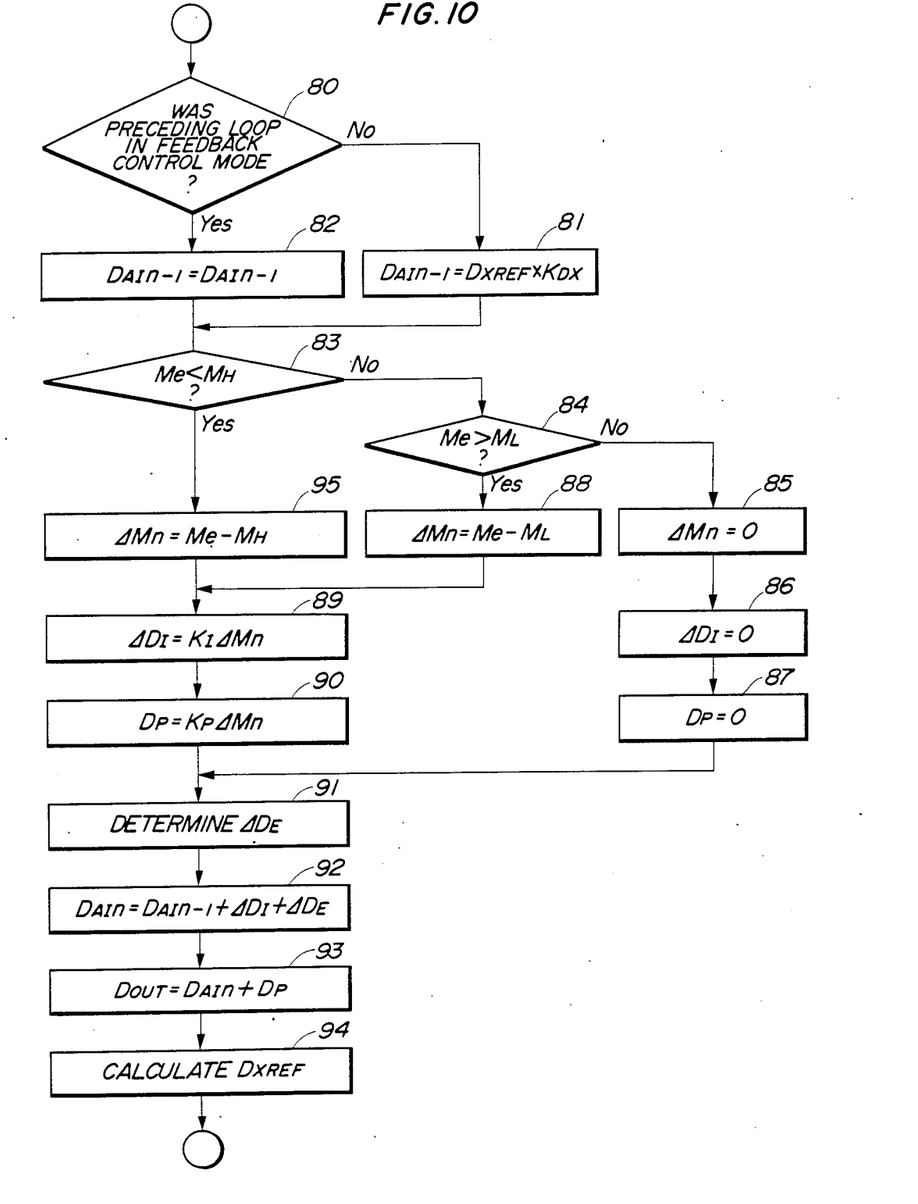
FIG. 10 is a flow chart showing a manner of calculating the valve opening duty ratio DOUT of the control valve applied in feedback mode control of the supplementary air quantity.

FIG. 10 shows a manner of calculating the valve opening duty ratio DOUT in feedback mode control, which is executed at the step 8 in FIG. 3.

First, at the step 80, it is determined whether or not feedback mode control of the idling speed was effected in the preceding loop executed in synchronism with an immediately preceding TDC signal pulse. If the answer at the step 80 is no, that is, if the preceding loop was in decelerating control mode, the step 81 is executed to set an integral control term DAIn-1 as an initial value which is applicable at the start of feedback mode control to a value equal to the valve opening duty ratio which has been set to a product obtained by correcting the mean value DXREF by the value of the correction coefficient KDXi set at the step 714 or at the step 716 in FIG. 5, in the last loop (i.e. DAIn-1=DXREF×KDXi). On the other hand, if the answer at the step 80 is yes, that is, if the preceding loop was in feedback control mode, the integral control term DAIn-1 is set to a value thereof obtained in the last loop, at the step 72.

After the value of the integral control term DAIn-1 having been thus set at the step 81 or 82, the program proceeds to the step 83 to determine whether or not the value Me corresponding to the reciprocal of the actual engine speed Ne is larger than the value MH corresponding to the reciprocal of the upper limit value NH of the desired idling speed range. If the answer at the step 83 is no, that is, if the relationship of Ne≦NH is satisfied, the step 84 is executed to determine whether or not the value Me is larger than the value ML corresponding to the reciprocal of the lower limit value NL of the same range. If the answer at the step 84 is no, that is, if the questions of the steps 83 and 84 are both negated, it is judged that the engine speed Ne is between the upper limit value NH and the lower limit value NL. Then, the program proceeds to the step 85 wherein a difference ΔMn between the value Me corresponding to the reciprocal of the actual engine speed Ne and the value corresponding to the reciprocal of the desired idling speed is set to zero (i.e. ΔMn=0), since it is then not necessary to increase or decrease the engine speed Ne, followed by setting a correction value ΔDI for the integral control term to zero at the step 86, and then setting a proportional control term DP to zero at the step 87.

On the other hand, if the answer at the step 84 is yes, that is, if it is determined that the actual engine speed Ne is lower than the lower limit value NL of the desired idling speed region, the step 88 is executed to calculate a difference ΔMn (>0) between the value ML corresponding to the reciprocal of the lower limit value NL and the value Me corresponding to the reciprocal of the actual engine speed Ne. Then, at the step 89, a correction value ΔDI for the integral control term DAIn-1 is calculated by multiplying the above difference ΔMn by a constant KI, and then at the step 90, the proportional control term DP is calculated by multiplying the difference ΔMn by a constant KP.

If the answer at the step 83 is yes, that is, if it is determined that the actual engine speed Ne is higher than the upper limit value NH of the desired idling speed range, the program proceeds to the step 95 to calculate a difference ΔMn (<0) between the value MH corresponding to the reciprocal of the upper limit value NH and the value Me corresponding to the reciprocal of the actual engine speed Ne, followed by the execution of the above steps 89 and 90 to calculate a correction value ΔDI and a proportional control term DP, respectively. Then, the program proceeds to the step 91 to calculate a correction value ΔDE as a difference between a present value of a correction value DE dependent upon on-off conditions of the switches 12 (in FIG. 1) of the electrical devices, not shown, and a preceding value thereof.

After a present value of the integral control term DAIn-1, and values of the correction value ΔDI for the integral control term and the correction value ΔDE for the electrical load-dependent correction value DE having thus been set at the aforementioned step 82 or 81, and at the steps 89 and 91, respectively, the program proceeds to the step 92 wherein a present value DAIn of the integral control term as a basic value of the valve opening duty ratio DOUT is calculated by the use of the above calculated values DAIn-1, ΔDI, and ΔDE (i.e. DAIn=DAIn-1+ΔDI+ΔDE). Then, at the step 93, a present value of the valve opening duty ratio DOUT is calculated by multiplying the thus obtained integral control term DAIn by the proportional control term DP calculated at the step 90.

Next, at the step 94, the mean value DXREF of valve opening duty ratio values DOUT which have been applied during past feedback mode control is calculated. The calculation of the mean value DXREF is executed by the following equation when the correction value ΔDE for the electrical load-dependent correction value DE is equal to zero with all the electrical devices not shown, in the off-state:

$$DXREF = \frac{C}{A} \times DAIn + \frac{A-C}{A} \times DXREF' \qquad (2)$$

where C and A are constants satisfying the relationship of 1≦C<A, DAIn is a value of the integral control term which is a feedback mode control term obtained in the present loop as a basic value of the valve opening duty ratio DOUT, and DXREF' is a mean value of the valve opening duty ratio values DOUT which had been obtained before the last feedback mode control loop. The value of the constant C is set to a suitable value within a range satisfying the above relationship, so as to adjust the ratio of the mean value DXREF' depending upon the specifications of the control system.

The mean value DXREF can also be calculated from the following equation:

$$DXREF = \frac{1}{B} \times \sum_{j=0}^{B} DAIn - j$$

wherein DAIn-j represents a value of the feedback mode control term DAIn obtained at a jth control action before the present one, and B a constant. According to the latter equation, a calculation is made of the sum of values of the feedback mode control term DAIn from the control action taking place B times before the present control action to the present control action, each time a value of DAIn is obtained, and a mean value of these values DAIn forming the sum is calculated.

Reverting to FIG. 3, at the step 9, the solenoid 7b of the control valve 7 is energized so as to supply supplementary air to the engine 1 in a quantity corresponding to the thus calculated valve opening duty ratio DOUT, to thereby maintain the engine speed Ne within the desired idling speed range defined by the upper limit value NH and the lower limit value NL.

During the idling speed feedback mode control, it can sometimes happen that the engine speed Ne temporarily rises above the upper limit value NH of the desired idling speed range due to a decrease in the engine load caused by external disturbances, etc. In such event, once the feedback mode control is started, the control of the supplementary air quantity is continued in feedback mode, even if the engine speed Ne temporarily rises above the upper limit value NH of the desired idling speed range, so long as the valve opening θth of the throttle valve 3 is equal to or smaller than the predetermined value θIDL. That is, when the engine speed Ne temporarily rises above the upper limit value NH of the desired idling speed range, due to external disturbances, etc., it is determined at the step 5 that the relationship of Me≧MH is not satisfied, and the program proceeds to the step 6. At the step 6, it is determined whether or not the last control loop was executed in feedback mode, and if the answer is yes, then the program proceeds to the step 8, thereby continuing the execution of feedback mode control.

When the throttle valve is opened while the engine is in an idling condition, the answer to the question of the step 3 becomes no, i.e. the relationship of $\theta$th$>\theta$IDL is satisfied. Then, the program proceeds to the aforementioned step 2 to fully close the control valve 7, followed by the execution of the step 9.

What is claimed is:

1. A method of controlling the operating amount of a control valve for regulating the quantity of supplementary air being supplied to an internal combustion engine, in a feedback manner responsive to the difference between a desired idling speed and an actual engine speed, while said engine is in a predetermined idling region, said engine having an intake passage, a throttle valve arranged in said intake passage, and an air passage having one end communicating with said intake passage at a location downstream of said throttle valve and another end with the atmosphere, respectively, said control valve being arranged in said air passage, said supplementary air being supplied to said engine through said air passage and said intake passage, the method comprising the steps of: (a) detecting a temperature of said engine; (b) detecting the decreasing rate of the rotational speed of said engine when said engine is decelerating with said throttle valve fully closed in a predetermined decelerating region immediately preceding said predetermined idling region; (c) correcting a basic value of the operating amount of said control valve based upon the detected temperature of said engine and the detected decreasing rate of the rotational speed of said engine; and (d) starting the feedback control by applying said basic value of the operating amount of said control valve thus corrected as an initial value thereof, when said engine is further decelerated into said predetermined idling region.

2. A method as claimed in claim 1, including the steps of setting the operating amount of said control valve to a value equal to said initial value thereof applicable at the start of the feedback control when said engine is in said predetermined decelerating region, and supplying said engine with supplementary air through said control valve in a quantity corresponding to the operating amount of said control valve thus set while said engine is decelerating in said predetermined decelerating region.

3. A method as claimed in claim 1 or claim 2, wherein said predetermined decelerating region is a region wherein the rotational speed of said engine is higher than said desired idling speed and at the same time lower than a predetermined value thereof set in dependence upon the detected engine temperature.

4. A method as claimed in claim 3, wherein said predetermined value of the rotational speed of said engine is set to higher values as the detected engine temperature increases.

5. A method as claimed in claim 1, wherein said basic value of the operating amount of said control valve is set to smaller values as the detected engine temperature increases.

6. A method as claimed in claim 1, including the steps of setting a predetermined value of the decreasing rate of the rotational speed of said engine, and when the detected decreasing rate of the rotational speed of said engine is smaller than said predetermined value, correcting said basic value of the operating amount of said control valve so as to increase at a first rate which corresponds to the detected engine temperature, while when the detected decreasing rate of the rotational speed of said engine is larger than said predetermined value, correcting said basic value of the operating amount of said control valve so as to increase at a second rate larger than said first rate, which corresponds to the detected engine temperature.

7. A method as claimed in claim 6, wherein said predetermined value of the decreasing rate of the rotational speed of said engine is set to smaller values as the detected engine temperature increases.

8. A method as claimed in claim 1, wherein said desired idling speed is set to lower values as the detected engine temperature increases.

9. A method as claimed in claim 1, wherein said basic value of the operating amount of said control valve is set to a mean value of values of the operating amount of said control valve which have been obtained during past feedback control.

10. A method as claimed in claim 2, including the steps of detecting the rotational speed of said engine, and when the detected engine speed is higher than said predetermined value thereof, correcting said basic value of the operating amount of said control valve so as to increase at said first rate which corresponds to the detected engine temperature, while when the detected engine speed is lower than said reference value thereof, correcting said basic value of the operating amount of said control valve so as to increase at said second rate which corresponds to the detected engine temperature, wherein said basic value of the operating amount of said control valve thus corrected by means of said second rate is applied as said initial value thereof at the start of the feedback control.

11. A method of controlling the operating amount of a control valve for regulating the quantity of supplementary air being supplied to an internal combustion engine, in a feedback manner responsive to the difference between a desired idling speed and an actual engine speed, while said engine is in a predetermined idling region, said engine having an intake passage, a throttle valve arranged in said intake passage, and an air passage having one end communicating with said intake passage at a location downstream of said throttle valve and another end with the atmosphere, respectively, said control valve being arranged in said air passage, said supplementary air being supplied to said engine through said air passage and said intake passage, the method comprising the steps of: (a) detecting a temperature of said engine; (b) detecting the decreasing rate of the rotational speed of said engine when said engine is decelerating with said throttle valve fully closed in a predetermined decelerating region immediately preceding said predetermined idling region; (c) correcting a basic value of the operating amount of said control valve based upon the detected temperature of said engine and the detected decreasing rate of the rotational speed of said engine; and (d) applying said basic value of the operating amount of said control valve thus corrected as the value of the operating amount of said control valve, while said engine is decelerating in said predetermined decelerating region until it enters said predetermined idling region.

12. A method as claimed in claim 3, wherein said basic value of the operating amount of said control valve is set to smaller values as the detected engine temperature increases.

* * * * *